United States Patent Office 3,280,956
Patented Oct. 25, 1966

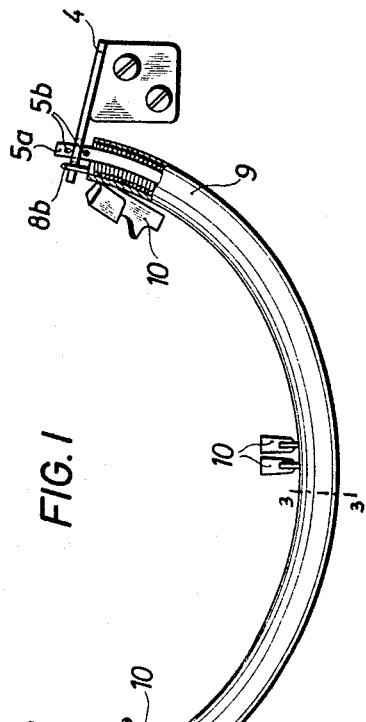
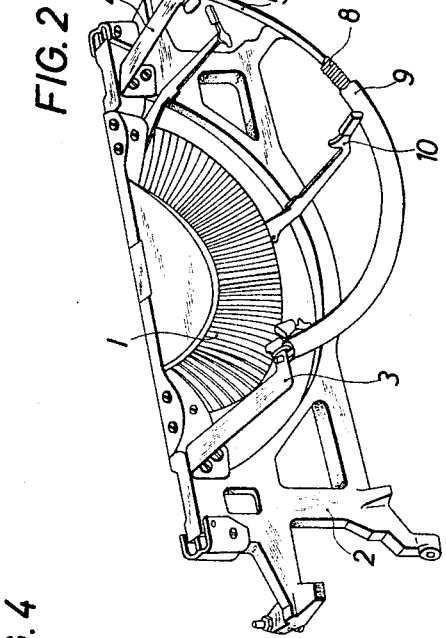
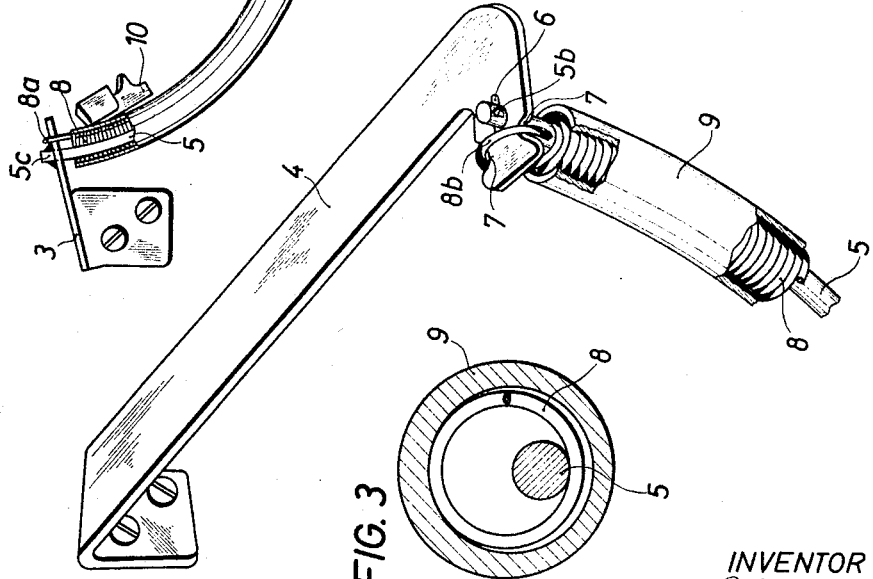
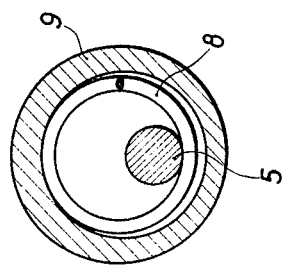

3,280,956
SHOCK ABSORBING STOP PARTICULARLY FOR TYPEWRITERS
Rolf Koenen, Krefeld, Germany, assignor to Olympia Werke A.G., Wilhelmshaven, Germany
Continuation of application Ser. No. 316,683, Oct. 16, 1963. This application Aug. 3, 1965, Ser. No. 479,044
Claims priority, application Germany, Oct. 17, 1962, O 9,030
8 Claims. (Cl. 197—42)

The present application is a continuation application of my copending application Serial No. 316,683, filed on October 16, 1963, now abandoned, and entitled "Shock Absorbing Stop, Particularly for Typewriters."

The present invention relates to a shock absorbing stop, and more particularly to a shock absorbing abutment or stop for the type levers of a typewriter. Shock absorbing stops have the purpose of preventing bouncing back of a stop element, and particularly the shock absorbing stop for the type levers or type bars of a typewriter perform a very important function inasmuch as it is desired that the kinetic energy of the returning type levers is completely absorbed by the stop with a minimum of noise.

Resilient elastic shock absorbing stops are known, however, the known constructions have the disadvantage that elastic shock absorbing elements used therein, are worn by the great number of repeated impacts of the type levers, and have a very short span of useful life.

It is one object of the present invention to overcome the disadvantages of known shock absorbing stops, particularly of a stop used in a typewriter for stopping the returning type levers, and to provide a shock absorbing stop by which noise is reduced, and the bouncing back of type levers is prevented.

Another object of the invention is to provide a shock absorbing stop or abutment for the type levers of an electric typewriter which are loaded by strong springs and contain a comparatively great kinetic energy when stopped.

Another object of the invention is to very quickly stop the returning type levers of a typewriter so that no bouncing back takes place and uniform imprints can be produced by type levers actuated in rapid succession.

Another object of the invention is to increase the writing speed of a typewriter by very rapidly stopping the return type levers on a shock absorbing stop.

With these objects in view, the present invention relates to a shock absorbing stop which is particularly suited as an abutment for the type levers of an electric typewriter.

In the accompanying drawings:

FIG. 1 is a front view, partially in section, illustrating a shock absorbing stop according to the present invention as used in a typewriter;

FIG. 2 is a perspective view on a reduced scale illustrating the type lever segment and the type levers of the typewriter combined with the shock absorbing stop of the invention;

FIG. 3 is a cross-sectional view on an enlarged scale, taken on line 3—3 in FIG. 1; and FIG. 4 is a fragmentary perspective view partially broken off, and illustrating on an enlarged scale a supporting arrangement for the end portions of the shock absorbing stop.

Referring now to the drawings, and more particularly to FIGS. 1 and 2, a type lever segment 1 is mounted on a segment carrier 2 of a typewriter. A pair of support arms 3 and 4 are secured by screws to segment carrier 2 on an opposite side of segment 1, each support arm having a bent end portion formed with a pair of recesses 7 and with a hole into which an end of an arcuate inner member 5 projects. Member 5 has a circular cross section, and one end 5c of member 5 is secured to the support arm 3, while the other end 5a is detachably held in the corresponding hole 6 of support arm 5 by means of a pair of projections 5b.

A cylindrical coil spring 8 surrounds the inner member 5 and has at the ends thereof curved end portions hooked into the pairs of recesses 7 of support arms 3 and 4.

Coil spring 8 has an inner diameter which is greater than the outer diameter of the inner member 5. By suitably bending the end portions of support arms 3 and 4, the spring 8 is urged to a position in which it abuts the outside of the arc of the arcuate inner member 5, and due to the fact that the inner diameter of spring 8 is greater than the outer diameter of member 5, spring 8 is spaced from the arcuate member 5 along the inside of the arc formed by member 5, as can be best seen in FIG. 3.

A tubular member 9 consisting of an elastomer, preferably Coroplast, or a synthetic rubber is loosely mounted on the spring 8. The material is selected so that it combines great mechanical strength and wear resistance with the desired elastic properties.

A series of type levers or type bars 10 are mounted in the type segment 1, and abut in a position of rest on the shock absorbing stop formed by members 5, 8 and 9.

When a type lever 1 returns from its actuated position to the position of rest abutting the shock absorbing stop, substantial kinetic energy is stored in the type lever, particularly if actuated by the power roll of an electric typewriter against the action of strong return springs. When a type lever 1 impinges the stop, it engages the tubular member 9 which exerts a dampening effect while the coil spring 8 gives resiliently and is displaced toward the inner side of the arcuate member 5. The transverse displacement of the coil spring 8 takes place not only at the impact point but along a longitudinal section of the coil spring with which the tubular elastic member 9 is simultaneously displaced. The energy is transformed into heat and friction, and completely consumed with the tubular member 9 not only damping the type lever, but also damping the resilient movements of spring 8.

Even after very long use of the shock absorbing stop, no permanent deformation of the stop takes place, and damage to the elastic tubular member 9 is not possible since the position of the coil spring 8 permits a giving of the tubular member 9 with coil spring 8 under the impact force of the return type lever.

The combination of coil spring 8 with a tubular elastic member 9 loosely surrounding the same has the advantage that the elasticity of tubular member 9 is added to the elasticity of the coil spring 8 so that not only the type lever is stopped, but also the noise is substantially and thoroughly suppressed.

Neither the elastic tubular member 9, nor coil spring 8 would be capable of achieving the shock absorbing effect produced by the combination of the two members.

The detachable connection of the end 5a of member 5 with support arm 4 permits an easy assembly of coil spring 8 and tubular member 9 on the inner member 5, whereupon the end portion 5a is attached to support arm 4, as explained above.

By bending the end portions of the support arms 4, the arcuate position of the cylindrical coil spring 8 can be adjusted until the same abuts the outside of the arc of inner member 5 along the entire length thereof, so that the effect is the same for all type levers 10, irrespective at what longitudinal section of the shock absorbing stop they are located.

It will be understood that each of the elements described above, or two or more together, may also find a useful application in other types of shock absorbing stops differing from the types described above.

While the invention has been illustrated and described as embodied in a shock absorbing stop for the type levers of a typewriter and including a coil spring, an elastic outer tubular member, and an arcuate inner member passing through the interior of the coil spring, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. A shock absorbing stop comprising, in combination, a support; an elongated inner member secured at the ends thereof to said support, spring means surrounding said inner member with clearance and contacting it along a narrow elongated portion thereof extending over a substantial part of the length of said spring means; and an elongated tubular elastic member surrounding said spring means with clearance and contacting it only along another narrow elongated portion thereof which is located diametrically opposite said one narrow elongated portion and which extends over at least a substantial part of the length of said spring means whereby, when an object impinges on said stop transversely of the elongation thereof, said tubular elastic member is enabled to dampen the resulting resilient movements of said spring means.

2. A shock absorbing stop as defined in claim 1, wherein said spring means is a metal coil spring means.

3. A shock absorbing stop as defined in claim 1, wherein said spring means is enabled to move freely over the entire length thereof in transverse direction relative to said inner member and to said outer tubular member.

4. A shock absorbing stop as defined in claim 1, wherein said support comprises a pair of support arms having bent end portions provided with a pair of opposite notches in each of said end portions, wherein said ends of said inner member are secured to said end portions inwardly of said notches, and wherein said ends of said spring means are secured in said pairs of notches and said spring means is held by said bent end portions of said support arms in arcuate position.

5. A shock absorbing stop as defined in claim 1, wherein said inner member is arcuate with reference to the elongation thereof, said cylindrical spring means is of a diameter greater than the diameter of said inner member and contacts the latter at the outside of the arc defined by said inner member, and wherein said tubular outer member consists of an elastomer.

6. A shock absorbing stop as defined in claim 5, wherein said elastomer is a synthetic material.

7. A shock absorbing stop as defined in claim 1, wherein both said inner member and said spring means are secured to said support only at their respective ends.

8. A shock absorbing stop as defined in claim 7, wherein the respective ends of said inner member are secured to said support independently of the respective ends of said spring means.

References Cited by the Examiner

UNITED STATES PATENTS

| | | | |
|---|---|---|---|
| 771,216 | 9/1904 | Stickney | 197—42 |
| 886,570 | 5/1908 | Young | 197—42 |
| 904,669 | 11/1908 | Barney | 197—42 |
| 1,005,780 | 10/1911 | Raber | 197—33 |
| 1,533,392 | 4/1925 | Corcoran | 197—42 |
| 2,329,942 | 9/1943 | Prezioso | 197—42 |
| 2,681,719 | 6/1954 | Lambert | 197—33 |
| 2,702,082 | 2/1955 | Wolf | 267—74 X |
| 2,720,959 | 10/1955 | Dodge et al. | 197—42 |
| 3,042,176 | 7/1962 | Brann | 197—42 |

ROBERT E. PULFREY, *Primary Examiner.*

E. S. BURR, *Assistant Examiner.*